US009230077B2

(12) United States Patent
Markwordt et al.

(10) Patent No.: US 9,230,077 B2
(45) Date of Patent: Jan. 5, 2016

(54) ALIAS-BASED SOCIAL MEDIA IDENTITY VERIFICATION

(71) Applicant: International Business Machines Corporation, Armonk, NY (US)

(72) Inventors: Joshua D. Markwordt, Cary, NC (US); Michael M. Skeen, Raleigh, NC (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 13/842,924

(22) Filed: Mar. 15, 2013

(65) Prior Publication Data
US 2014/0282870 A1 Sep. 18, 2014

(51) Int. Cl.
H04L 29/06 (2006.01)
G06F 21/31 (2013.01)
G06Q 20/40 (2012.01)
G06Q 50/00 (2012.01)
H04L 29/08 (2006.01)

(52) U.S. Cl.
CPC .......... G06F 21/31 (2013.01); G06Q 20/4014 (2013.01); G06Q 50/01 (2013.01); H04L 63/08 (2013.01); H04L 63/104 (2013.01); H04L 67/306 (2013.01)

(58) Field of Classification Search
None
See application file for complete search history.

(56) References Cited
U.S. PATENT DOCUMENTS

| 7,069,308 | B2 * | 6/2006 | Abrams | 709/218 |
| 7,188,153 | B2 * | 3/2007 | Lunt et al. | 709/218 |
| 8,150,860 | B1 | 4/2012 | Cierniak et al. | |
| 8,190,884 | B2 * | 5/2012 | Alroy et al. | 713/155 |
| 8,239,677 | B2 * | 8/2012 | Colson | 713/166 |
| 8,250,632 | B1 * | 8/2012 | Staddon | 726/4 |
| 8,387,122 | B2 * | 2/2013 | Toomim et al. | 726/5 |
| 8,402,548 | B1 | 3/2013 | Muriello et al. | |
| 8,571,519 | B2 * | 10/2013 | Ginzboorg | 455/411 |
| 8,620,828 | B1 * | 12/2013 | Harrison, Jr. | 705/319 |

(Continued)

OTHER PUBLICATIONS

Linner, David; Kirsch, Fabian; Radusch, Ilja; Steglich, Stephan. Context-aware Multimedia Provisioning for Pervasive Games. Seventh IEEE International Symposium on Multimedia. Pub. Date: 2005. http://ieeexplore.ieee.org/stamp/stamp.jsp?tp=&arnumber=1565814.*

(Continued)

Primary Examiner — Jeremiah Avery
(74) Attorney, Agent, or Firm — VanLeeuwen & VanLeeuwen; Joseph Petrokaitis

(57) ABSTRACT

An approach is provided to use social media content to verify the identity of a user using aliases established by the user in a social media environment. In the approach, a user authentication request pertaining to a user is received. Aliases corresponding to the user's social media contacts are retrieved from a social media data store. User questions and expected answers are prepared based on the user's social media contacts and the corresponding aliases. The user is prompted to provide one or more user answers responsive to the user questions. In response to receiving answers that match the expected answers, the user authentication request is confirmed. Conversely, in response to receiving user answers that fail to match the expected answers, the user authentication request is invalidated.

10 Claims, 10 Drawing Sheets

(56) References Cited

U.S. PATENT DOCUMENTS

| | | | |
|---|---|---|---|
| 8,819,789 B2* | 8/2014 | Orttung et al. | 726/5 |
| 8,972,400 B1 | 3/2015 | Kapczynski et al. | |
| 2002/0165969 A1 | 11/2002 | Gallant | |
| 2006/0010487 A1* | 1/2006 | Fierer et al. | 726/5 |
| 2008/0288299 A1 | 11/2008 | Schultz | |
| 2009/0187979 A1 | 7/2009 | Sever | 726/5 |
| 2009/0249451 A1 | 10/2009 | Su et al. | |
| 2009/0288150 A1 | 11/2009 | Toomim et al. | |
| 2009/0292814 A1* | 11/2009 | Ting et al. | 709/229 |
| 2010/0250676 A1 | 9/2010 | Ufford et al. | 709/204 |
| 2010/0257577 A1 | 10/2010 | Grandison et al. | |
| 2011/0258686 A1* | 10/2011 | Raj et al. | 726/6 |
| 2012/0036080 A1 | 2/2012 | Singer et al. | |
| 2012/0066758 A1 | 3/2012 | Kasturi | 726/9 |
| 2012/0214442 A1 | 8/2012 | Crawford et al. | |
| 2012/0216260 A1* | 8/2012 | Crawford et al. | 726/5 |
| 2012/0303425 A1 | 11/2012 | Katzin et al. | |
| 2012/0303659 A1* | 11/2012 | Erhart et al. | 707/769 |
| 2013/0144785 A1* | 6/2013 | Karpenko et al. | 705/44 |
| 2013/0144864 A1 | 6/2013 | Noble et al. | |
| 2013/0218480 A1* | 8/2013 | Fuhrman et al. | 702/29 |
| 2013/0218991 A1 | 8/2013 | McConnell et al. | |
| 2013/0219480 A1* | 8/2013 | Bud | 726/7 |
| 2014/0067825 A1 | 3/2014 | Oztaskent et al. | |
| 2014/0172857 A1 | 6/2014 | Powell | |
| 2014/0379581 A1 | 12/2014 | Bailey, Jr. | |

OTHER PUBLICATIONS

Fong, Simon; Zhuang, Yan; Lu, Luke; Tang, Rui. Analysis of General Opinions about Sina Weibo Micro-blog Real-name Verification System. 2012 International Conference on Future Generation Communication Technology. Pub. Date: 2012. Relevant pp. 83-88. http://ieeexplore.ieee.org/stamp/stamp.jsp?tp=&arnumber=6476588.*

Sha, Abad; Farooq, Amjad; Talib, Kashif. User-Oriented Identity Management Model for Web-Services. International Symposium on High Capacity Optical Networks and Enabling Technologies, 2007. HONET 2007. Relevant pp. 1-8. http://ieeexplore.ieee.org/stamp/stamp.jsp?tp=&arnumber=4600277.*

Lu, Li; Han, Jinsong; Hu, Lei; Huai, Jinpeng; Liu, Yunhao; Ni, Lionel M. Pseudo Trust: Zero-Knowledge Based Authentication in Anonymous Peer-to-Peer Protocols. IEEE International Conference on Parallel and Distributed Processing Symposium, 2007. Relevant pp. 1-10. http://ieeexplore.ieee.org/stamp/stamp.jsp?tp=&arnumber=4228012.*

Anonymous, "Identifying a Social Network User Identifier Based on a User Message," IP.com, IPCOM000198126D, Jul. 26, 2010, 31 pages.

Nair, "Method and System for Generating a Social Graph between Users in a Network using Social Graphs of the Users from External Social Networks," IP.com, Copyright Yahoo!, IPCOM000195329D, Apr. 29, 2010, 4 pages.

Squicciarini et al., "Towards a Game Theoretical Model for Identity Validation in Social Network Sites," IEEE International Conference on Privacy, Security, Risk, and Trust, and IEEE International Conference on Social Computing, Oct. 2011, Boston MA, pp. 1081-1088.

Yom-Tov et al., Method and System for Improving Retrieval of Social Media Posts based on Location and Frequency of Posting on Social Media, IP.com, Copyright Yahoo!, IPCOM000213200D, Dec. 8, 2011, 3 pages.

Nemoto et al., "Poster: Knowledge-Based Authentication using Twitter," Kanagawa Institute of Technology, Kanagawa, Japan, In Proceedings of the 9$^{th}$ conference on USENIX Security Symposium, vol. 9, Aug. 2000, Denver, CO, 2 pages.

"Computer Scientists Work to Strengthen Online Security," ScienceDaily LLC, Nov. 9, 2009, 2 pages.

Babic et al., "Building Robust Authentication Systems With Activity-Based Personal Questions," SafeConfig '09, Nov. 2009, Chicago, IL, 5 pages.

"10 Common Misconceptions Businesses Have About Identity Proofing," IDology Whitepaper, Idology, Inc., Copyright 2007, 7 pages.

Topkara, "Information Security Applications of Natural Language Processing Techniques," PhD Dissertation, Purdue University, West Lafayette, IN, Aug. 2007, 124 pages.

Office Action for U.S. Appl. No. 14/488,573 (Markwordt et al., "Alias-Based Social Media Identity Verification," filed Sep. 17, 2014), U.S. Patent and Trademark Office, mailed Mar. 10, 2015, 50 pages.

Office Action for U.S. Appl. No. 13/842,594 (Markwordt et al., "Social Media Based Identity Verification," filed Mar. 15, 2013), U.S. Patent and Trademark Office, mailed Mar. 30, 2015, 34 pages.

Office Action for U.S. Appl. No. 14/487,681, Markwordt et al., "Social Media Based Identity Verification," filed Sep. 16, 2014), U.S. Patent and Trademark Office, mailed Mar. 31, 2015, 34 pages.

Final Office Action for U.S. Appl. No. 13/842,594 (Markwordt et al., "Social Media Based Identity Verification," filed Mar. 15, 2013), U.S. Patent and Trademark Office, mailed Aug. 10, 2015, 25 pages.

Office Action for U.S. Appl. No. 14/487,681, Markwordt et al., "Social Media Based Identity Verification," filed Sep. 16, 2014), U.S. Patent and Trademark Office, mailed Aug. 12, 2015, 23 pages.

* cited by examiner

ALIAS-BASED SOCIAL MEDIA IDENTITY VERIFICATION

TECHNICAL FIELD

The present disclosure relates to an approach that verifies a person's identity based on aliases established by a user in a social media environment.

BACKGROUND OF THE INVENTION

Unauthorized use of credit cards costs credit companies billions of dollars per year. Most security measures currently in place provide inadequate security. A primary security measure used is the signature on the card which can easily be forged. Secondary measures include requesting the cardholder's postal code, however postal code information can often be easily obtained from other items in the cardholder's wallet (in the case of a stolen wallet), or by retrieving address information from public telephone directories. Furthermore, the use of postal codes to verify a transaction is actually illegal in some states and jurisdictions. Some credit card companies attempt to monitor a cardholder's normal usage patterns and call the user to verify a transaction that falls outside such patterns. However, such monitoring is time consuming, error prone, and obtrusive to the user as the user's current transaction is often denied while the credit card company attempts to telephone the user and obtain verification.

In addition, using a user's credit card without authorization for on-line transactions is often quite difficult to detect. The measures used in authenticating on-line users has led credit card companies to enact question-based verification. For example, the credit card company may store questions and answers provided by the user. Challenges with this approach are that the answers to the questions can often be found on-line with little research as well as the fact that the questions are static in nature.

Additional countermeasures to credit card fraud have been developed by credit card companies, but each of these also has limitations. For example, one measure is use of a username/password prompt, however this can easily be cracked by a computer given enough time and based on the strength of the password. Another measure used is called "CAPTCHA" which presents distorted letter/number images that the user has to type at a keyboard. While CAPTCHA has the advantage of defeating computers, the measure requires no special knowledge in that any person capable of seeing the CAPTCHA can enter the answer. Another measure uses knowledge based authentication (KBA)—This is the question answer prompts that are often used as an extra layer of security or to recover a forgotten password, however the questions and answers are static in nature and are provided by the user long before the verification is requested. For example, a question might be "What is your hometown?", but the answer to such question can often be found through online resources, or in the case of a stolen wallet, such information is often on identification cards and such found in the user's wallet. In addition, the question/answer combination in KBA systems is static in nature (e.g., the name of the user's hometown does not change over time, etc.).

SUMMARY

An approach is provided to use social media content to verify the identity of a user using aliases established by the user in a social media environment. In the approach, a user authentication request pertaining to a user is received. Aliases corresponding to the user's social media contacts are retrieved from a social media data store. User questions and expected answers are prepared based on the user's social media contacts and the corresponding aliases. The user is prompted to provide one or more user answers responsive to the user questions. In response to receiving answers that match the expected answers, the user authentication request is confirmed. Conversely, in response to receiving user answers that fail to match the expected answers, the user authentication request is invalidated.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
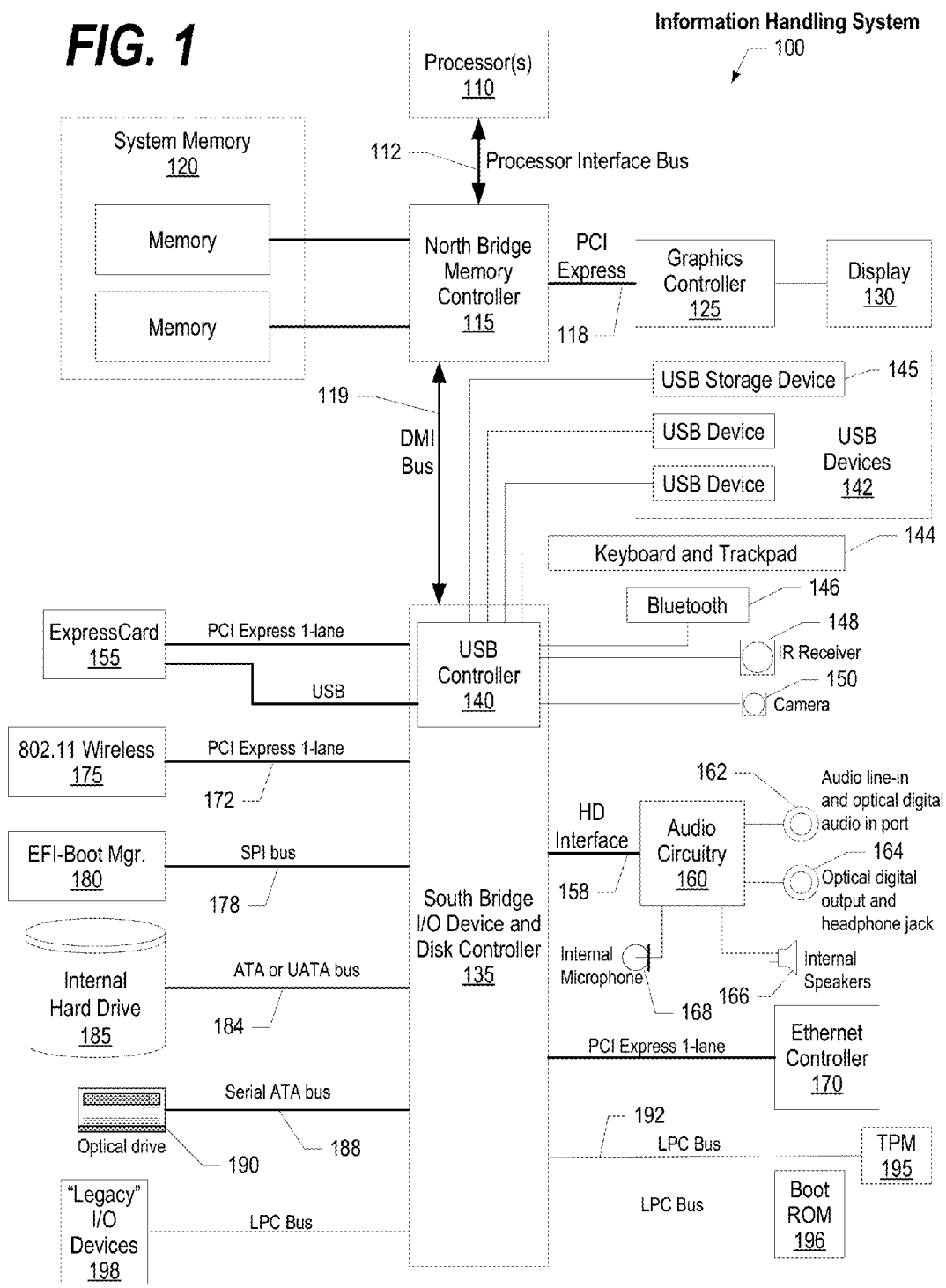
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
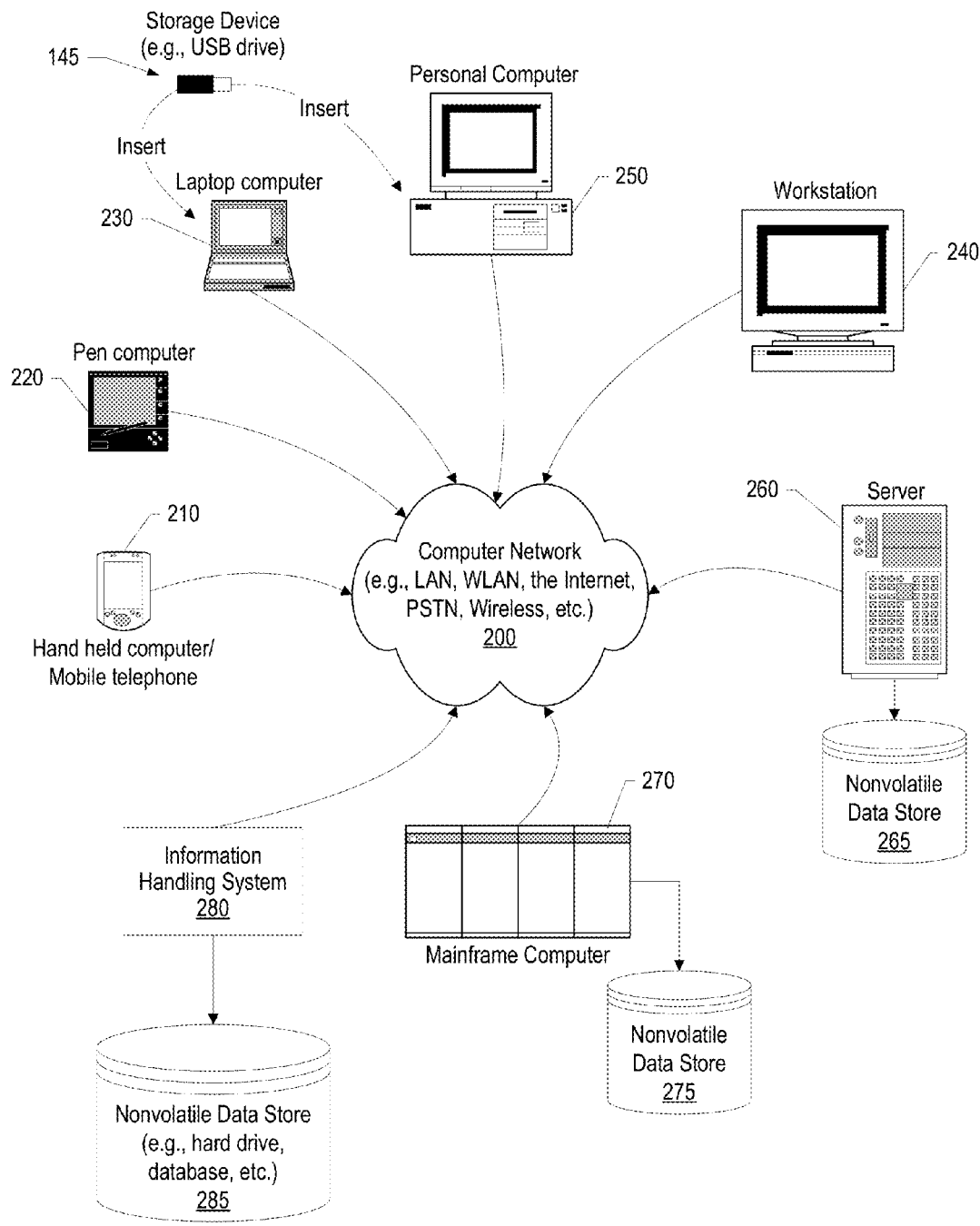
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-10 depict an approach that can be executed on an information handling system, such as a mobile device, and computer network as shown in FIGS. 1-2. A system and method to dynamically select questions for user authentication based on aliases established by the user for the user's contacts in a social networking/media environment. In addition, activities corresponding to the aliases can be used to form the user questions. An activity includes, but is not limited to a user's posts, comments on another user's post on their "wall", who attended the event a user was at etc derived from one or more posts, comments or calendar entries. In addition, the system selects the complexity of the questions based on the desired security level of authentication (e.g., purchase amount, type of account, etc). The system detect the usage of aliases within the social media environment in order to ascertain how well known or how secret an alias is maintained. An alias that is maintained in secret provides a higher security score than an alias that is found on multiple social media pages. The system identifies contacts of the user that the user has assigned an alias. When alias-based questions are asked about user contacts with a user-assigned alias, an imposter would not know which contact is being referenced by a question or how to answer a question using a contact's alias.

Aliased contact might be people that the user follows rather closely or knows fairly well so they would be very likely to have monitored their social media status of have performed various activities with such contacts. A strength calculation is performed based both on how much the user interacts with a contact as well as how little (how disconnected) they interact with each other. For example if a user chose his mother as one aliased contact, a sibling might have just as much knowledge of her activities and be able to answer all of the same questions, however the sibling might not know the alias that you have chosen for your mother (e.g., "Mama"). In addition, if the user selected a second aliased contact from a completely different group of friends and this contact was not friends with the mother or the sibling, then the strength calculation would be rather strong and generate a set of questions that only someone else who is friends with both the mother and the other friend would be able to answer. As you select additional aliased contacts, it becomes more likely that the user will be the only person who has all of the alias information assigned to each of the contacts.

When activity-based content are included as part of the alias-based user questions, the complexity of the questions leverages the visibility of the user's social media contacts (e.g., "friends," etc.). For example, a lower level of complexity for a small credit card transaction could be to ask questions concerning recent posts on the users social media "wall" or front page. Being that their contacts could see these posts, the security level would be considered less since the information is more easily accessible. However, a more complex technique selects multiple questions on other user's "walls" where all of the other users do not have relationships which allows visibility to their posts (e.g., the user is the only social media able to view the selected combination). This combination of visibility would not permit other users access to all the questions. In one embodiment, the service is executed by one or more servers as part of the social network with the ability of third party sites, such as credit card transaction/verification sites, to request questions at a certain difficulty level and then submit answers that will be verified within the social networking servers. In this manner, the user's social media data need not be distributed over the network (e.g., the Internet, etc.). The approach discussed above is further described in FIGS. 3-10 and accompanying detailed descriptions, discussed below, which provide further details related to one or more embodiments that provide social media based security.

Figure 3:
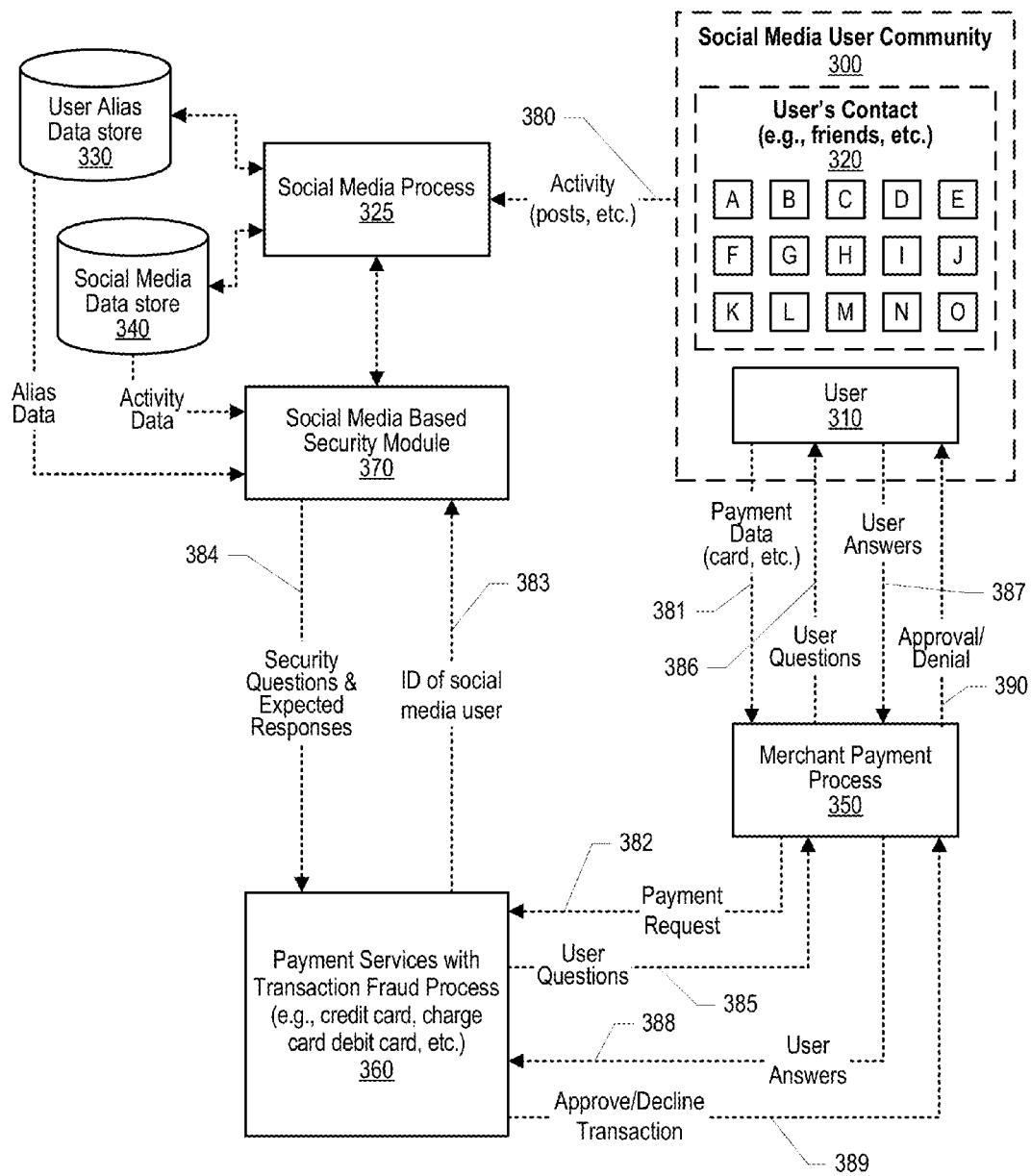
FIG. 3 is a component diagram showing the various components used in performing social media based identity verification.
Figure 4:
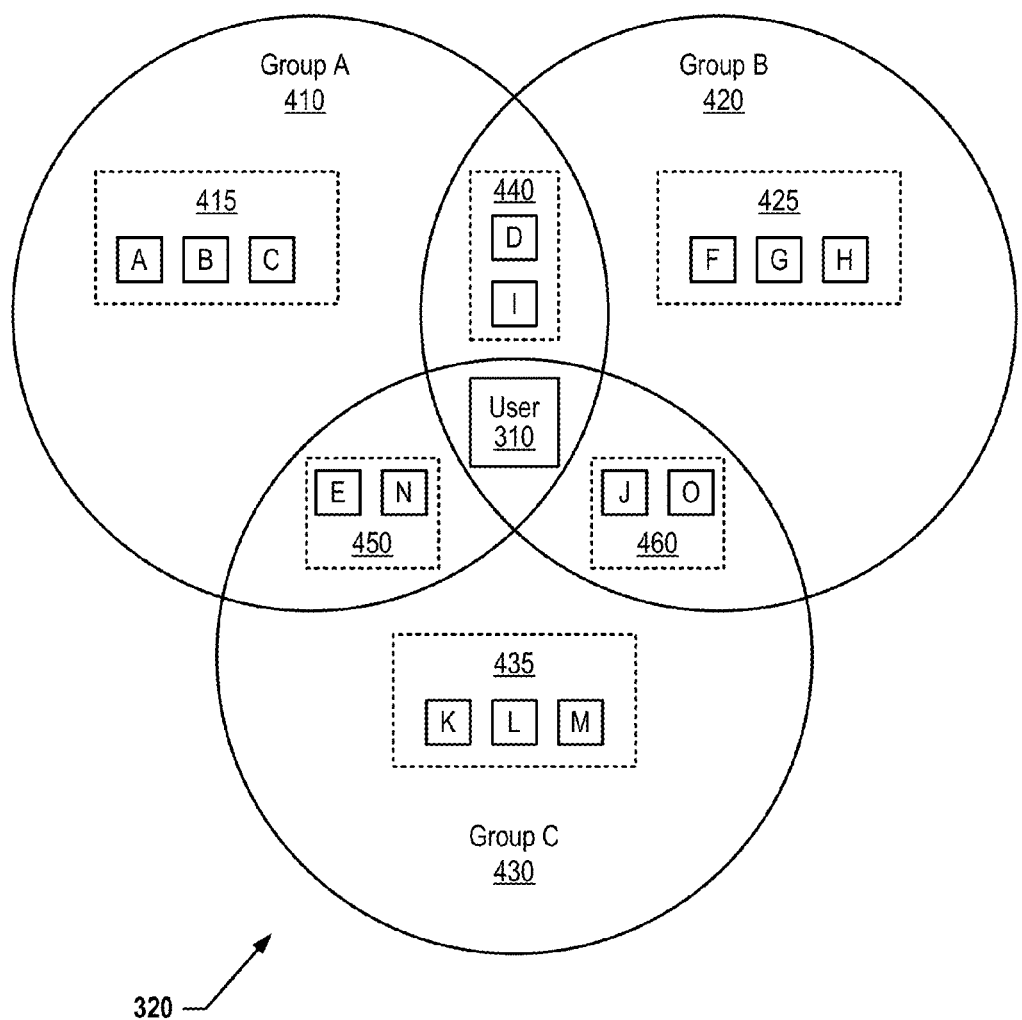
FIG. 4 is a depiction of a diagram showing distinct user groups identified when selecting questions for social media based identity verification.

FIG. 3 is a component diagram showing the various components used in performing social media based identity verification. Social media user community 300 is a social media environment for communicating with a network of contacts (e.g., "friends," etc.). Within the social media user community, user 310 has a the set of contacts 320. While user 310 is a contact of each of the user contacts included in group 320, each of the contacts is likely not a contact of all of the other users shown in group 320. For example, user "A" might be a contact of user "D" but might not be a contact of user "F". Similarly, user "D" might be a contact of both "A" and "F" but might not be a contact of user "M". An example of the overlap between contact groups is shown in FIG. 4. Social media process 325, such as that performed by a social media website, collects dynamic social media content, such as comments, posts, tweets, multimedia, likes, requests, and other social media activities made by social media user community 300 (e.g., by the user 310, the user's contacts 320, etc.). Activity data maintained by the social media site is stored in social media data store 340. In addition, user 310 can use social media process 325 to establish aliases corresponding to one or more of user's contacts 320. For example, the user could set up aliases for friends and family members. Such aliases could be names used in person (e.g., "mama" for the user's mother, etc.), and could also include aliases known only to the user and only used online (e.g., secret alias names assigned to various contacts of the user, etc.). Aliases established by the user for various user contacts 320 are stored in user alias data store 330.

Processes used in the social media based identify verification system include merchant payment process 350, such as a transaction or payment process performed by a merchant. The merchant can be an online merchant (e.g., website, etc.) or can be at a physical retail establishment (e.g., gas station, department store, etc.). Another process included in the social media based identify verification system is payment services process 360, such as a process performed by a credit or debit card company to authenticate a user that is attempting to make a purchase from a retailer. Social media based security process 370 provides social media based security questions and answers by retrieving data from data stores 330 and 340. These social media based security questions and answers are used as the basis for authenticating the user of a transaction.

Next, the various data flows between the various entities and process is discussed. First, user 310 request to purchase an item or services by providing a payment card (e.g., credit card, debit card, etc.) in data flow 381. Such information often includes an account, or card, number, expiration dates, and the like. Merchant payment process 350 receives the payment data from the user and transmits payment request 382 to payment service 360 that is used to authenticate the user request. Such payment service may be maintained by a credit card company, a bank, etc. Payment service 360 requests social media based authentication data in data flow 383. In one embodiment, the payment service retrieves a social media identifier used by user 310 in the social media system based on the user's unique account identifier data (account number, card number, etc.). Social media based security process 370 retrieves one or more user questions and a corresponding one or more expected answers. The user questions and expected answers are based upon dynamic social media content accessible by the user and stored in data stores 330 and 340. In one embodiment, process 370 further checks for indicators that the user has actually viewed such content before formulating questions and answers (e.g., the user posted a comment on the content, indicated a "like" or preference of the content, etc.).

In data flow 384, the social media based security process returns the questions and expected answers to payment services process 360. While shown separately, many of the processes shown may be executed by a common entity. For example, social media based security process 370 and payment services process 360 can be both executed and maintained by the payment service company (e.g., bank, credit card company, etc.) or could be executed and maintained as a service provided by a social media provider.

Payment service process 360 transmits the security questions (user questions) back to merchant payment process 350 in data flow 385, so that the merchant can pose such user questions to the user in data flow 386. The user provides user answers to the questions in data flow 387. The dialog between the merchant process and user 310 may be performed on a display device, such as at a kiosk, at the user's information handling system (e.g., smart phone, computer system, etc.). The merchant process provides the user answers back to payment services in data flow 388. Payment services process 360 compares the user answers with the expected answers in order to determine whether to allow the transaction. The indication as to whether the transaction is approved is transmitted from payment service process 360 back to merchant payment process 350 in data flow 389. The merchant then communicates the approval or denial back to the user in data flow 390. As mentioned previously, some of the processes shown can be consolidated. As another example, the payment service could transmit both the user questions and the expected answers back to merchant process 350 and the merchant process could determine whether the users answers match the expected answers. However, moving the comparison and determination further away from the user may provide additional security so that a user that is able to hack or otherwise infiltrate the merchant system would not be able to obtain access to the expected answers.

FIG. 4 is a depiction of a diagram showing distinct user groups identified when selecting questions for social media based identity verification. In one embodiment, based on the security level required for the transaction, questions are posed to user 310 so that, preferably, only the user or a very small number of the user's contacts would have access to all of the answers that are responsive to the questions posed. Often, multiple questions and corresponding answers are needed to facilitate this process, as illustrated by the example shown in FIG. 4. In this simplified example, the user's contacts (320) has three primary groups of contacts. For example, Group A (410) might mostly include family members of user 310, while Group B (420) mostly includes non-work related friends of the user, while finally Group C (430) mostly includes work related friends of the user. Contacts might not fall neatly into the various groups and some amount of overlap might be found. In the example, subgroup 415 includes those contacts that are contacts with everyone in Group A, including subgroups 440 and 450. Similarly, subgroup 425 is a contact of everyone in Group B including subgroups 440 and 460, and subgroup 435 is a contact of everyone in Group C including subgroups 450 and 460. Overlapping subgroups are those contacts that are contacts of more than just one major group. For example, contacts in subgroup 440 are contacts with everyone in Groups A and B (including contacts in subgroups 450 and 460). Likewise, members of overlapping subgroup 450 are contacts of everyone in Group A and C (including contacts in subgroups 440 and 460), and members of overlapping subgroup 460 are contacts of everyone in Group B and C (including contacts in subgroups 440 and 450).

Therefore, when selecting user questions, limiting the contacts that would also have access to the information would be helpful in increasing the divergence strength score that is used to ascertain how reliable a question/answer combination is to authenticating the user. For example, if the user had two contacts, X and Y, that were not contacts with any of the user's other contacts, then basing a question/answer combination on an activity posted by contact X would narrow the field of other user contacts in possession of the expected answer to one (contact X). Adding another question/answer combination based on the activities posted by contact Y would further narrow the set of user contacts with social media based access to the expected answer to only the user.

Such an approach is used in calculating a divergence strength value (e.g., score of 100 indicates that only the user has social media access to the set of questions being posed, score of 99 indicates that only the user and one other user contact has access to the set of questions being posed, score of 50 indicates that approximately 50 contacts have such access, score of 1 indicating that 99 or more of the contacts have access, etc.). In some circumstances, such as a low level purchase at a gas station, a lower security level might be used (e.g., any security level greater than 10 so that 90 or fewer other contact could have access to the posed questions/answers, etc.). Conversely, in other circumstances, such as a high level purchase of expensive jewelry at a jewelry store, a much higher security level might be used (e.g., a security score of at least 99 indicating that no more than one of the user's contacts can have access to all of the posed questions/answers, etc.). Likewise, the higher the required security level for the transaction, the more user questions may need to be posed to achieve the high security score.

Figure 5:
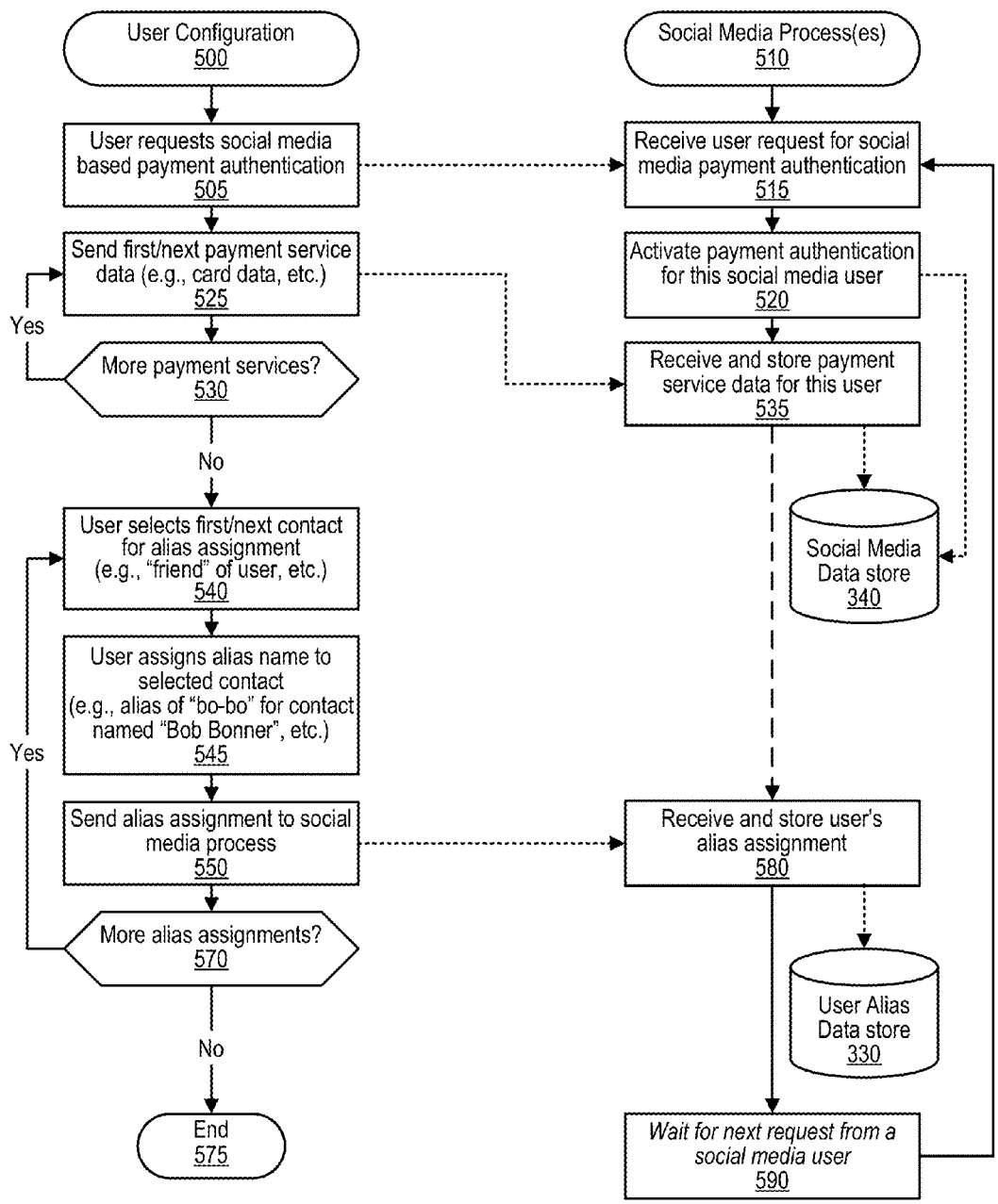
FIG. 5 is a depiction of a flowchart showing the logic used in user configuration of social media based identity verification and such configuration interacting with social media processes.

FIG. 5 is a depiction of a flowchart showing the logic used in user configuration of social media based identity verification and such configuration interacting with social media processes. User configuration process commences at 500 whereupon, at step 505, the user requests to use social media based payment authentication. Social media processes are shown commencing at 510 whereupon, at step 515, the social media process receives the user request to use social media payment authentication. At step 520, the social media process activates the ability of the user to use social media authentication and stores an indicator in social media data store 340.

Returning to user configuration processing, at step 525 the user submits the payment service data corresponding to the first payment service (e.g., a credit card description/number, etc.). A decision is made as to whether the user wishes to register more payment services (e.g., credit cards, bank cards, etc.) with the social media security process (decision 530). If the user wishes to register more payment services, then decision 530 branches to the "yes" branch which loops back to receive the users next payment service submission. This looping continues until the user does not with to register any more payment services, at which point decision 530 branches to the "no" branch for further user configuration processing. Turning to the corresponding social media process, at step 535, the social media process receives each of the payment services (e.g., credit cards, debit cards, bank cards, etc.) for which the user is registering and the social media process stores the payment service data in data store 340.

Returning to user configuration processing, at step 540, the user selects the first contact of the user for which an alias is being assigned. In one embodiment, the user selects the contact from a list of displayed social media contacts displayed to the user by the social media system. At step 545, the user assigns an alias name to the selected contact. For example, the user could assign an alias of "bo-bo" for a contact named "Bob Bonner." The alias assigned could be a nickname or other type of alias that the user also uses outside of the social media security process or could be an alias that is assigned and not promulgated outside the social media security process so that the identity of the alias is further maintained. For example, if one of the user's contacts reminds the user of a movie star, the user could assign an alias of the contact to the name of the movie star without revealing the alias to the contact or others. At step 550, the user configuration process transmits the first alias assignment to the social media process. A decision is made as to whether the user wishes to make any further alias assignments (decision 570). If the user wishes to make further alias assignments, then decision 570 branches to the "yes" branch which loops back to step 540 to select the next contact, assign the alias, and transmit the alias assignment data to the social media security process. Such looping continues until the user does not wish to make any further alias assignments, at which point decision 570 branches to the "no" branch whereupon user configuration processing ends at 575.

Turning now to social media security processing in handling alias assignments, at step 580 the social media process receives the alias assignment made by the user and stores the alias assignment in user alias data store 330. At step 590, the social media security process waits for the next security configuration request to be received by one of the social media users, at which point social media processing loops back to step 515 to process the next social media security configuration request by one of the social media's users.

Figure 6:
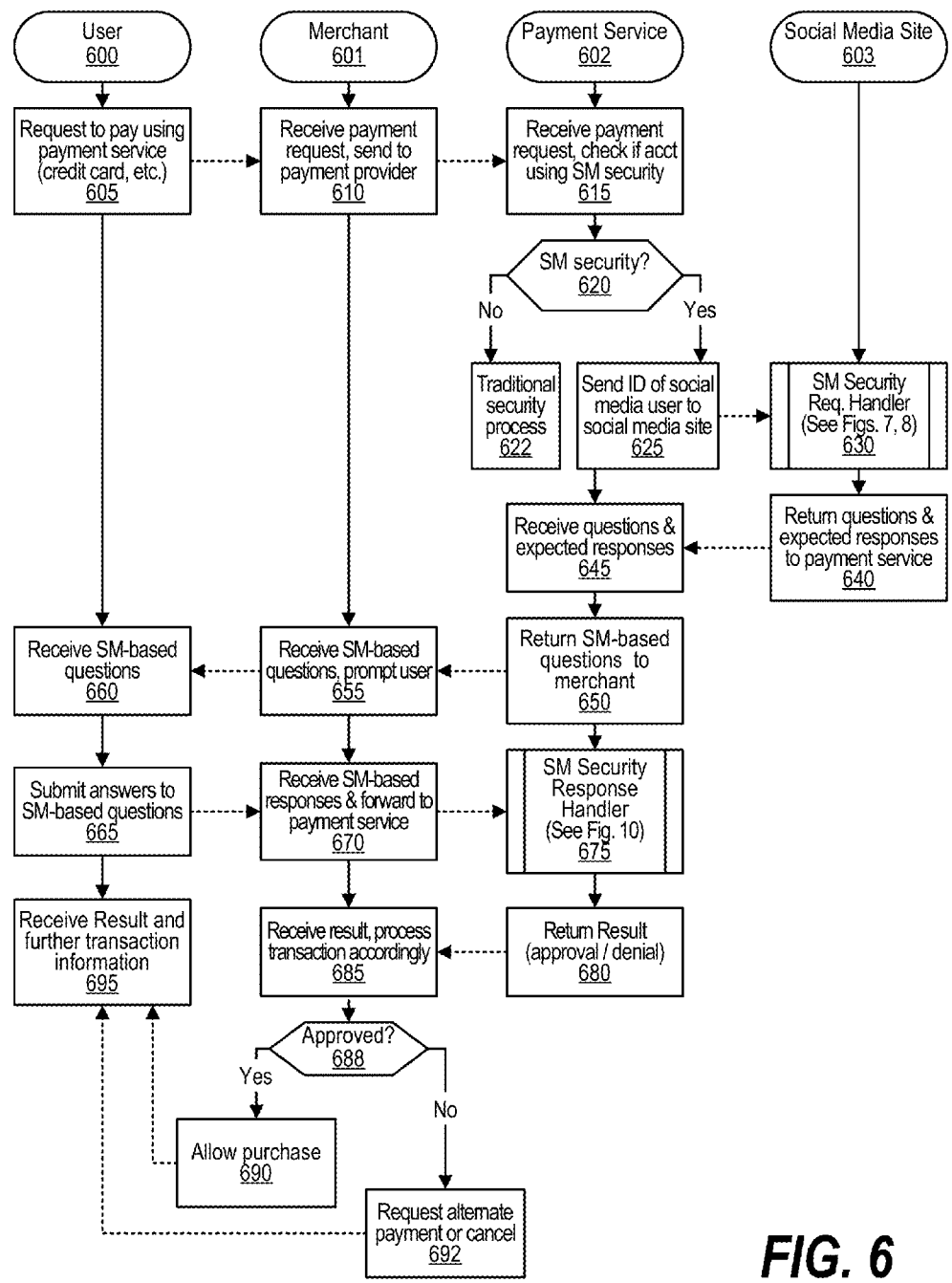
FIG. 6 is a depiction of multiple flowcharts interacting between the various entities involved in social media based identity verification.

FIG. 6 is a depiction of multiple flowcharts interacting between the various entities involved in social media based identity verification. The different entities include the user, the merchant, the payment service, and the social media security service. User processing is shown commencing at 600, with merchant processing commencing at 601, payment service processing commencing at 602, and social media security service processing commencing at 603. Overall processing commences at 600 which commences the user process whereupon, at step 605, the user requests to pay for an item or service by utilizing a payment service (e.g., credit card, debit card, bank card, etc.). This information, in the form of an account or card number, is conveyed to the merchant. Merchant processing, commencing at 601, starts at step 610 with the merchant receiving the payment request from the user and sending the payment request data to the payment service for processing and user authentication.

Payment service processing commences at 602 whereupon, at step 615, the payment service receives the payment request from the merchant and checks the user account data to ascertain whether the user is using social media based security (e.g., whether the user previously established social media based security such as by using a process similar to the one shown in FIG. 5, etc.). A decision is made as to whether the user associated with the account data provided by the merchant is using the social media based security that is provided by the payment service (decision 620). If the user's account is not set up to use social media based security, then decision 620 branches to the "no" branch whereupon, at step 622, traditional security and user authentication processes are used in lieu of social media based security processes. Note that additional steps utilized in the traditional security process are not shown. On the other hand, if the user's account has been set up to use social media based security, such as by configuring the social media security as shown in FIG. 5, then decision 620 branches to the "yes" branch whereupon, at step 625, the payment service sends an identifier corresponding to the user of the account to the social media based security process. In one embodiment, the payment service retrieves the social media identifier corresponding to the user's account and sends the social media identifier to the social media based security process, while in another embodiment, the payment service sends the user's payment data (e.g., credit card number, etc.) to the social media based security service which, in turn, retrieves the user's social media account information based on the payment data.

Figure 7:
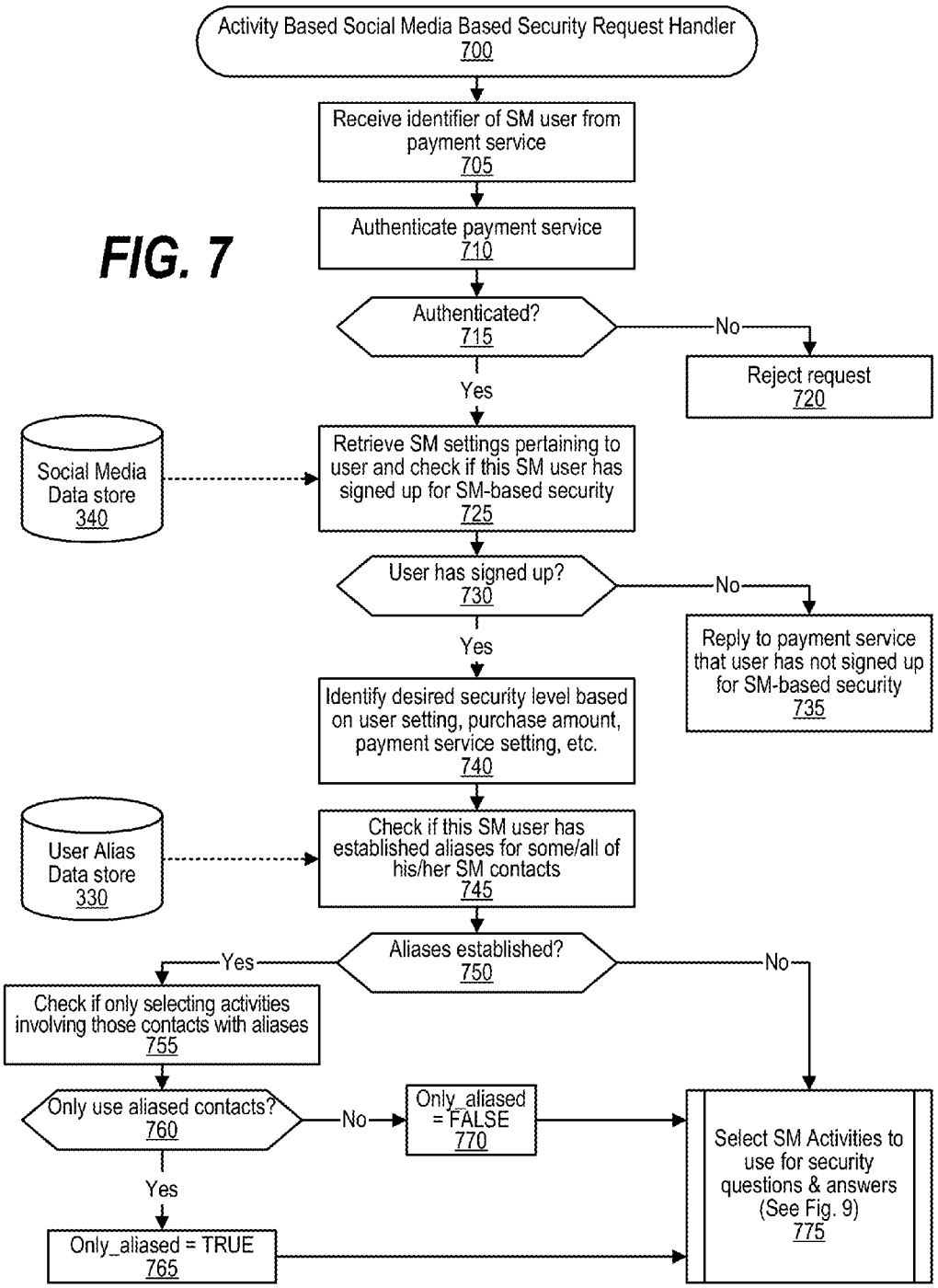
FIG. 7 is a depiction of a flowchart showing the logic performed by a social media process that handles activity based social media based security requests.
Figure 8:
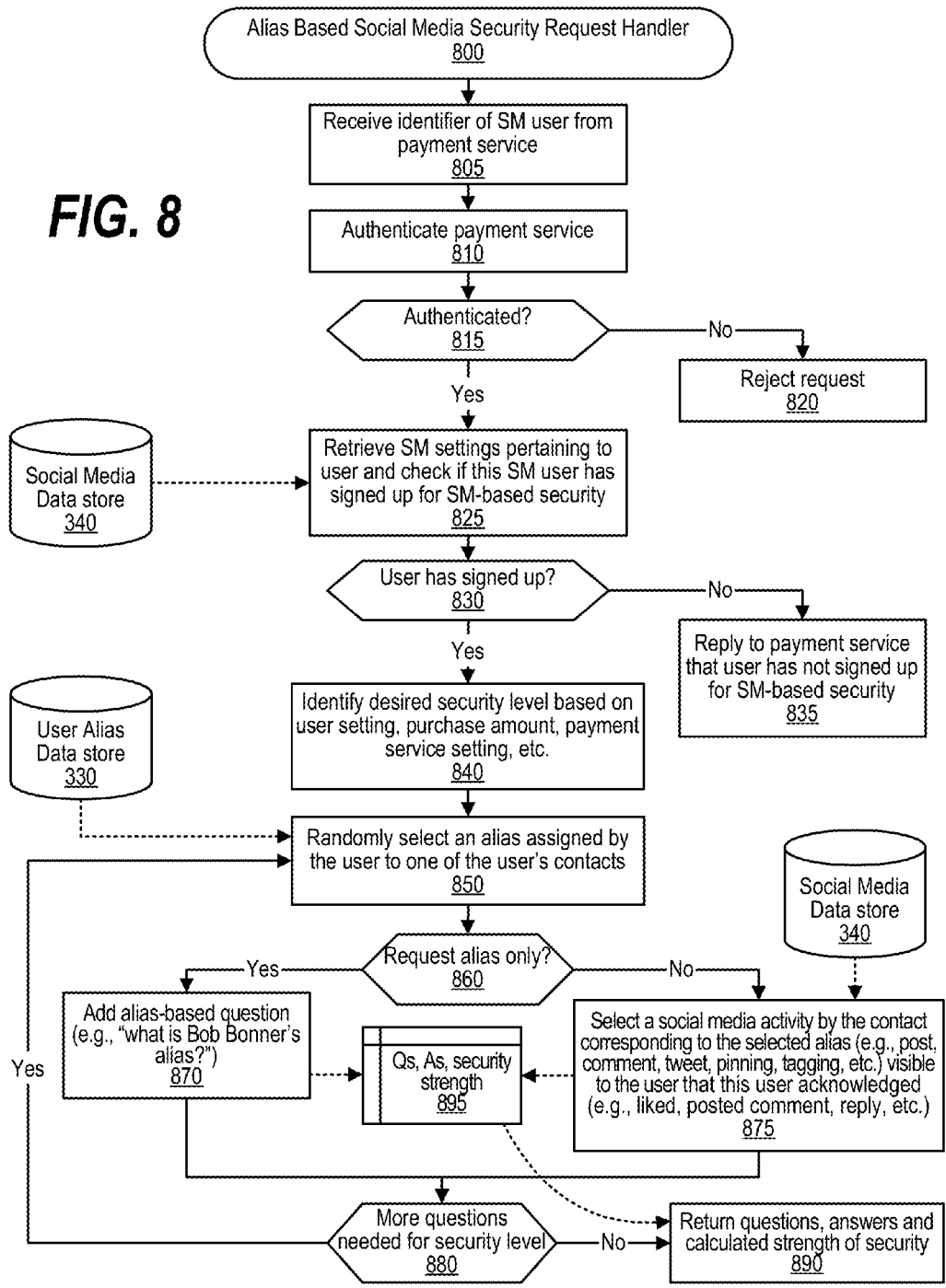
FIG. 8 is a depiction of a flowchart showing the logic performed by a social media process that handles alias based social media security requests.

Social media based security processing is shown commencing at 603 whereupon, at predefined process 630, the social media based security process handles the social media based request received from the payment service (see FIGS. 7 and 8 and corresponding text for processing details). At step 640, the social media based security process returns a set of one or more social media based questions along with the expected answers to the questions. These questions and expected answers are returned to the payment service for use in authenticating the user.

Returning to payment service processing, at step 645, the payment service receives the questions and expected answers from the social media based security process. At step 650, the payment service sends the social media based user questions to the merchant so that the questions can be posed to the user and responses can be received. Returning to merchant processing, at step 655, the merchant receives the social media based user questions from the payment service, poses the questions to the user and prompts the user for a response. At step 660, the user receives the social media based user questions and the prompt from the merchant to provide responsive user answers. At step 665, the user provides user answers responsive to the user questions (e.g., verbally using voice-recognition technology, using a keyboard or keypad device, providing a multiple-choice selection from which the user selects a response using a touch-activated display, etc.). The user answers are transmitted to the merchant process which receives the user answers and forwards such user answers to the payment service at step 670.

Figure 10:
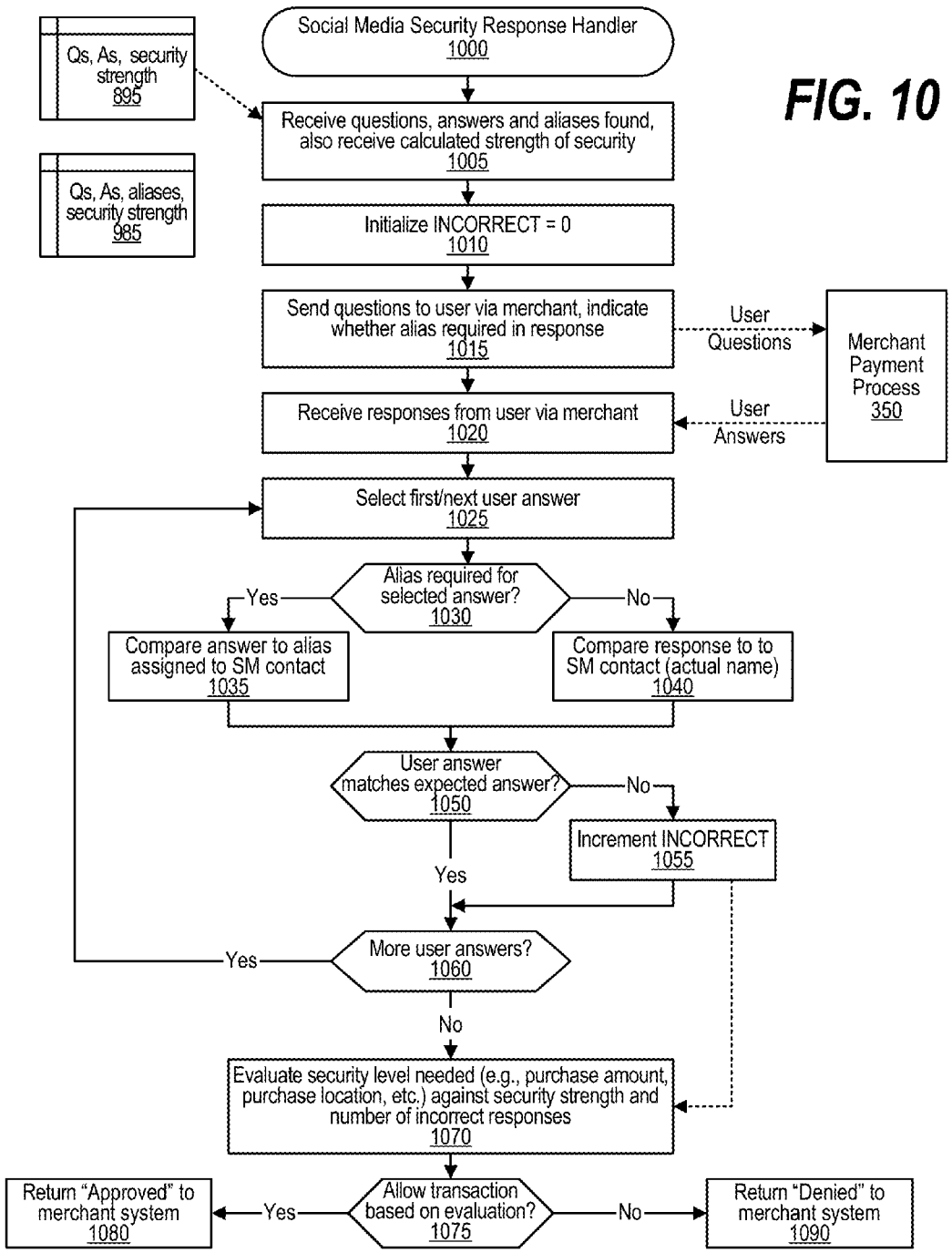
FIG. 10 is a depiction of a flowchart showing the steps performed by a process that evaluates a user's responses to social media based security questions.

Turning again to payment processing, at predefined process 675 the payment process receives the user answers from the merchant and processes the user's responses to compare the user answers with the expected answers and, consequently, to decide whether to allow or deny the transaction, based on the comparison (see FIG. 10 and corresponding text for processing details). At step 680, the payment system returns the result of predefined process 675 to the merchant (e.g., transaction approved, transaction denied, etc.).

Turning now to merchant processing, at step 685, the merchant receives the result from the payment service and completes the transaction based on the result (e.g., allow the purchase if result is an approval, deny the purchase if the result is a denial, etc.). A decision is made by the merchant as to whether the result received from the payment service is an approval (decision 688). If the result received from the payment service is an approval, then decision 688 branches to the "yes" branch whereupon, at step 690, the purchase is approved and the user is notified accordingly. Conversely, if the result received from the payment service is a denial, then decision 688 branches to the "no" branch whereupon, at step 692, the purchase is denied and the user is notified accordingly. Finally, turning to user processing, at step 695 the user receives the result of the purchase request (approved, denied, etc.).

FIG. 7 is a depiction of a flowchart showing the logic performed by a social media process that handles activity based social media based security requests. Processing commences at 700 whereupon, at step 705, the process receives the identifier of the social media user (e.g., from the payment service, etc.). In one embodiment, the payment service retrieves the user's social media identifier (e.g., username, etc.) from a table (e.g., database, etc.) using the user's payment account data (e.g., credit card number, etc.). In another embodiment, the payment service sends the payment account data to the social media security request handler which looks up the user's social media account identifier from a table maintained by the social media security service. At step 710, the social media security request handler authenticates the payment service that is making the request to the social media security request handler using traditional authentication means (e.g., digital keys, digital signatures, etc.). The payment service is authenticated to ensure that the request is not from a malevolent process attempting to hack the social media security request handler. A decision is made as to whether the payment service was successfully authenticated (decision 715). If the payment service was not successfully authenticated, then decision 715 branches to the "no" branch whereupon the request is rejected at step 720. On the other hand, if the payment service was successfully authenticated, then decision 715 branches to the "yes" branch for further social media security request handling.

At step 725, the social media security request handler retrieves social media settings from social media data store 340 pertaining to the social media user corresponding to the request. In addition, at step 725 the process checks to see if the social media user has been signed up (configured) to use social media based security checks. A decision is made as to whether the social media user has signed up to use social media based security checks (decision 730). If the user has not signed up, then decision 730 branches to the "no" branch whereupon, at step 735, the social media security request handler sends a reply to the payment service notifying the payment service that the user has not signed up to use social media based security checks—the payment process will therefore use traditional security checks to attempt to authenticate the user. On the other hand, if the user has signed up to use social media based security checks, then decision 730 branches to the "yes" branch for further social media based security request processing.

At step 740, the social media security request process identifies a security level desired with the security level based on the user's configuration settings, the purchase amount, other factors related to the purchase, etc. In one embodiment, the payment service includes the desired security level in the request that was sent to the social media based security process and received at step 705. At step 745, the social media security request process reads user alias data store 330 to ascertain whether the user has established aliases for at least some of the user's contacts. A decision is made as to whether the user has established such aliases (decision 750). If the user has established aliases for some of the user's contacts, then decision 750 branches to the "yes" branch whereupon, at step 755, the process checks the user's configuration setup to ascertain if the user only wishes to use activities for contacts with established aliases. A decision is made as to whether the configuration setting is set to only use aliased contacts (decision 760). If only aliased contacts are being used, then decision 760 branches to the "yes" branch whereupon, at step 765, a flag is set indicating that only aliased contacts are to be used. On the other hand, if any contacts can be used by the social media activity selection process, then decision 760 branches to the "no" branch whereupon, at step 770, the flag is set indicating that any contacts (aliased or non-aliased) are to be used. After determining whether aliases are established or are being exclusively used, at predefined process 775, social media activities are selected for use with user questions and expected answers (see FIG. 9 and corresponding text for processing details).

FIG. 8 is a depiction of a flowchart showing the logic performed by a social media process that handles alias based social media security requests. In FIG. 8, the user questions and expected answers are focused on the use of aliased contacts by the user. Steps 805 through 840 are quite similar to corresponding steps 705 through 740 described in FIG. 7 and such descriptions are repeated below for completeness of FIG. 8. Processing commences at 800 whereupon, at step 805, the process receives the identifier of the social media user (e.g., from the payment service, etc.). In one embodiment, the payment service retrieves the user's social media identifier (e.g., username, etc.) from a table (e.g., database, etc.) using the user's payment account data (e.g., credit card number, etc.). In another embodiment, the payment service sends the payment account data to the social media security request handler which looks up the user's social media account identifier from a table maintained by the social media security service. At step 810, the social media security request handler authenticates the payment service that is making the request to the social media security request handler using traditional authentication means (e.g., digital keys, digital signatures, etc.). The payment service is authenticated to ensure that the request is not from a malevolent process attempting to hack the social media security request handler. A decision is made as to whether the payment service was successfully authenticated (decision 815). If the payment service was not successfully authenticated, then decision 815 branches to the "no" branch whereupon the request is rejected at step 820. On the other hand, if the payment service was successfully authenticated, then decision 815 branches to the "yes" branch for further social media security request handling.

At step 825, the social media security request handler retrieves social media settings from social media data store 340 pertaining to the social media user corresponding to the request. In addition, at step 825 the process checks to see if the social media user has been signed up (configured) to use social media based security checks. A decision is made as to whether the social media user has signed up to use social media based security checks (decision 830). If the user has not signed up, then decision 830 branches to the "no" branch whereupon, at step 835, the social media security request handler sends a reply to the payment service notifying the payment service that the user has not signed up to use social media based security checks—the payment process will therefore use traditional security checks to attempt to authenticate the user. On the other hand, if the user has signed up to use social media based security checks, then decision 830 branches to the "yes" branch for further social media based security request processing.

At step 840, the social media security request process identifies a security level desired with the security level based on the user's configuration settings, the purchase amount, other factors related to the purchase, etc. In one embodiment, the payment service includes the desired security level in the request that was sent to the social media based security process and received at step 805.

Steps 840 through 890 differ from steps 745 through 775 found in FIG. 7 as FIG. 7 based user questions and expected answers on social media activities while steps 840 through 890 focus on user-assigned aliases for the user's contacts. Returning to FIG. 8, at step 850 the process randomly selects an alias that the user has assigned for one of the user's contacts from user alias data store 330. A decision is made as to whether only the alias is being used in the user question and expected answer (decision 860). If only the alias is being used, then decision 860 branches to the "yes" branch whereupon, at step 870, an alias-based user question is added to memory area 895 (e.g., "what is Bob Bonner's alias?" etc.), along with the expected answer (e.g., "bo-bo", etc.). Conversely, the question could relate to the alias (e.g., "which contact has an assigned alias of 'bo-bo'?") with the expected answer being the contact name (e.g., "Bob Bonner", etc.). In addition, the calculated security strength that is achieved based on the user question being answered successfully is included in memory area 895. For example, an alias that is private and does not appear in posts, comments, messages, etc. would have a higher strength score than an alias that does appear in such information areas. Furthermore, the selection performed at step 850 could be programmed to be non-random in order to favor selecting aliases that provide higher security scores.

Returning to decision 860, if more data than just the alias data is being used in the user question and/or expected answer, then decision 860 branches to the "no" branch whereupon, at step 875, a social media activity made by the contact that corresponds to the selected alias is selected. For example, a post, comment, tweet, pinning, tagging, etc. that is visible to the user is selected. In one embodiment, only those activities that the user actually acknowledged (e.g., liked, posted comment, reply, etc.) are selected. Here, the user question might be "which contact bought a new car this week? (use alias)". So, if "Bob Bonner" bought the new car, then the expected answer would be the alias established for Bob Bonner (e.g., "bo-bo", etc.). The user question, expected answer, and calculated security strength score are stored in memory area 895. Here, however, the calculated strength score is based on both the non-pervasiveness of the alias within social media content as well as the universe of contacts that have access to the underlying user question (e.g., how many social media contacts have access to all of the social media based activities being posed by the assortment of user questions, etc.).

After the user question, expected answer, and security strength scores have been stored in memory area 895, a decision is made as to whether additional social media based security questions should be posed to achieve the desired security level that was included in the request from the payment service. If more social media based security questions are needed to achieve the desired security level, then decision 880 branches to the "yes" branch which loops back to select the next alias upon which a user question and expected answer will be based. This looping continues until no further questions are needed to achieve the desired security level, at which point decision 880 branches to the "no" branch whereupon, at step 890, the process returns the user questions, expected answer, and overall security strength to the payment process.

Figure 9:
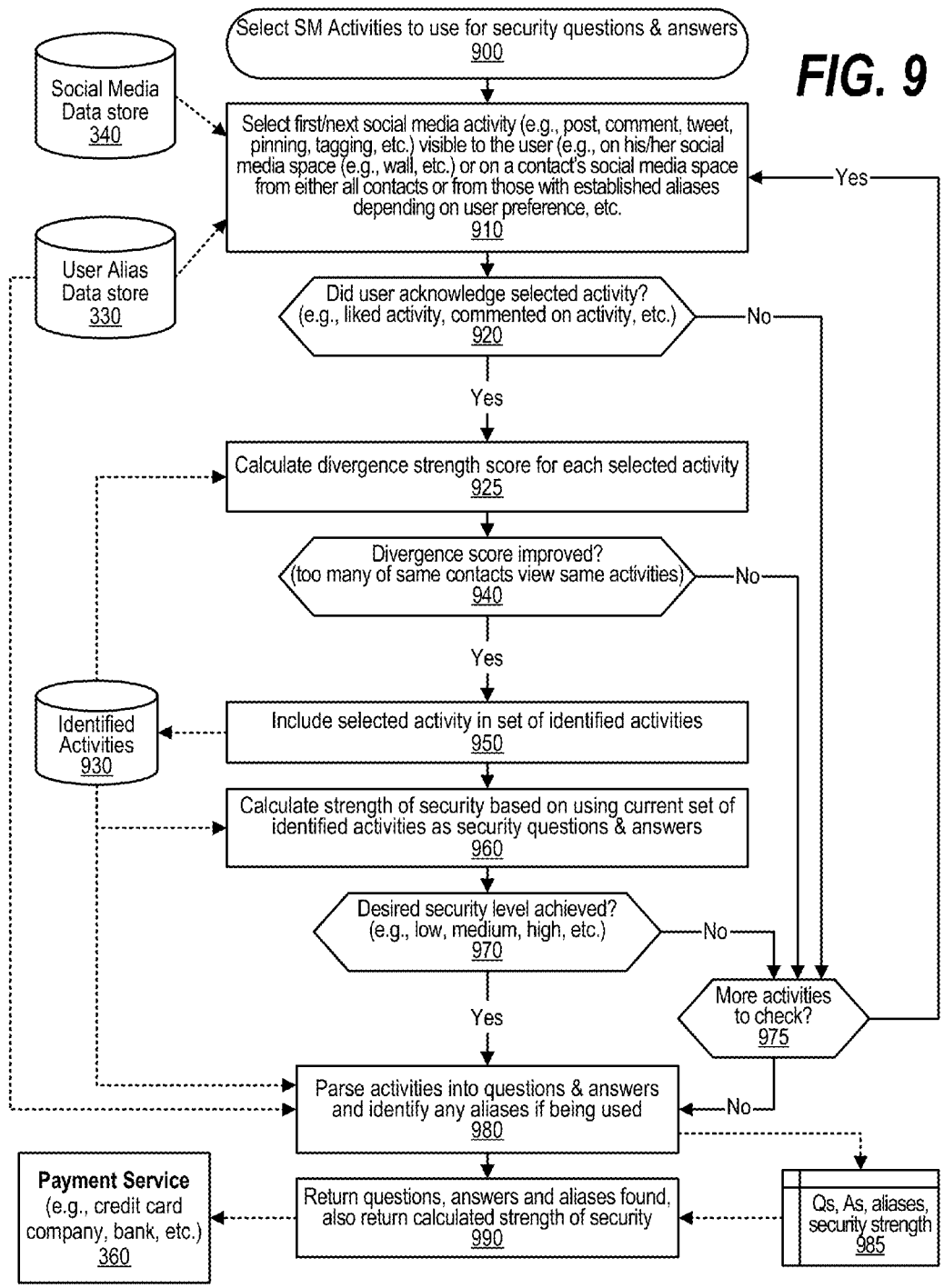
FIG. 9 is a depiction of a flowchart showing the logic performed by a social media process that selects social media activities to use for security questions and answers.

FIG. 9 is a depiction of a flowchart showing the logic performed by a social media process that selects social media activities to use for security questions and answers. Processing of the social media based process commences at 900 whereupon, at step 910, the first social media activity (e.g., a post, comment, tweet, pinning, tagging, etc.) that is visible to the user when the user is using the social media application is selected. For example, the activity may appear on the user's social media space (e.g., wall, etc.) or on a contact's social media space. The selection performed at step 910 can be either all contacts or from those with established aliases depending on user preference. For example, if the "Only_aliased" flag has been set to TRUE by the processing previously shown and described in FIG. 7, then only social media activities corresponding to contacts with assigned aliases are used in the selection at step 910. Otherwise, activities by any of the user's contacts may be selected at step 910. The activities are retrieved from social media data store 340 and, if aliases are being utilized, the list of aliases assigned by the user are retrieved from user alias data store 330.

A decision is made as to whether the user is likely to be aware of the activity by detecting whether the user acknowledged the selected activity (decision 920). Users can acknowledge an activity in various ways depending on the social media platform that is being used. For example, in some social media environments a user can indicate a "like" or "dislike" of an activity, can submit a comment or post related to the activity, etc. In one embodiment, if the user did not acknowledge the selected social media activity, then the selected activity is not a good candidate because there is a good chance that the user might be unaware of the activity and be unable to answer the social media based user question correctly. In this embodiment, decision 920 branches to the "no" branch which bypasses the remaining steps if the user has not acknowledged the selected social media activity so that another social media activity can be selected. On the other hand, if the social media activity has been acknowledged by the user (or in an embodiment that does not check for user acknowledgement of the activity), then decision 920 branches to the "yes" branch for further processing.

At step 925, a divergence strength score is calculated based on the number of user contacts that have access to the selected social media activity and all previously selected social media activities. As this is the first selected social media activity, the score is initialized to a score based on the number of social media contacts that also have access to the selected social media activity. For example, using a 100 point scoring system (with 100 being a perfect score), if 60 other users also have access to the activity, then the initialized score would be 40 (100−60). When other social media activities are selected, the divergence strength score is re-calculated to indicate the users that have access to all of the selected social media activities. For example, when a second social media activity is selected, if the number of contacts that have access to both the first selected activity and the second selected activity is only 5, then the score increases dramatically to 95 (e.g., 100−5=95). If no other contacts have access to all of the selected activities, then the score is a perfect 100 (e.g., 100−0=100). Of course, other scoring methodologies and systems can be used to evaluate the strength of the set of activities selected. In addition, the use of aliases in the questions might be used in some systems to enhance the score as it might be determined that few, if any, contacts have access to the alias assigned to a contact by the user. A decision is made as to whether the divergence strength score is too low with regard to the selected activity (decision 940). For example, if the selected question does not improve the divergence strength score, then decision 940 branches to the "no" branch to select a different social media activity. However, if the selected activity improves the divergence strength score, then decision 940 branches to the "yes" branch to include the selected social media activity with the set of identified activities that will be used to formulate the user questions and expected answers.

At step 950, the selected social media activity is included in the set of identified social media activities and stored in data store 930. At step 960, the security level that is achieved using the set of selected activities is calculated based on the divergence strength score achieved by using the set of activities as user questions and expected answers. In addition, other security factors, such as whether one or more aliased names are being used as expected answers, can also be used to adjust the security score. A decision is made as to whether the security level desired by the payment service is obtained from the set of selected activities stored in data store 930 (decision 970). In one embodiment, the security levels are set as values such as "low," "medium," and "high" depending on the purchase that is being attempted by the user. In another embodiment, the security level is a score, such as a numerical value, that is compared to the strength value calculated at step 960. If the desired security level is not yet achieved using the set of social media activities selected and stored in data store 930, then decision 970 branches to the "no" branch whereupon processing can loop back to add additional activities to the set of identified activities. This looping continues until the desired security level has been achieved based on the set of social media activities that have been selected and stored in data store 930. When this occurs, decision 970 branches to the "yes" branch to complete processing of the identified social media activities.

As described above, a low divergence strength score implies a greater number of contacts with access to the set of selected activities as opposed to a high divergence strength score that implies a lower number of contacts with access to the set of selected activities. The decision as to whether the strength level is too low may also be based on comparing the current divergence strength score achieved by using all of the questions in data store 930 with the security level requested in the request from the payment service. For example, a low security level, such as for a low-level purchase at a gas station, may require a strength score, while, on the other hand, a high security level, such as for a high-level purchase for several thousands of dollars at a jewelry store may require a high security score.

Returning to decision 970, when the desired security level has been achieved based on the set of social media activities that have been selected and stored in data store 930, then decision 970 branches to the "yes" branch whereupon, at step 980, the process parses the activities into user questions and expected answers. In addition, if any aliases are being used for any of the activities, the aliases are identified and used in the user questions and/or expected answers. For example, if the selected activity is a post by a user named Bob Bonner that stated, "my son was just named the captain of his football team", the user question might be "Who recently posted 'my son was just named the captain of his football team'?" and the expected answer would be set to "Bob" or "Bob Bonner." Likewise, if the user had assigned an alias of "bo-bo" for the contact Bob Bonner, then the expected answer would be set to "bo-bo". In one embodiment, the user question instructs the user to provide an alias name when an alias is included in the expected answer (e.g., "Who recently posted 'my son was just named the captain of his football team'? (provide alias)", etc.). The set of user questions and expected answers are stored in memory area 985 along with the security strength associated with the set of user questions and expected answers. At step 990, the social media security process returns the user questions, expected answers, and security strength to payment service 360 for use in authenticating the user.

FIG. 10 is a depiction of a flowchart showing the steps performed by a process that evaluates a user's responses to social media based security questions. In one embodiment the process shown in FIG. 10 is performed by a payment services process. Processing commences at 1000 whereupon, at step 1005 the process receives a set of user questions and expected answers from the social media security process. In one embodiment, when user assigned aliases are being used as the basis for the user questions and expected answers, memory area 895 is received by the response handler (see FIG. 8 and corresponding text for details regarding the formation of memory area 895). In another embodiment, where social media activities are being used as the basis for the user questions and expected answers, memory area 985 is received (see FIG. 9 and corresponding text for details regarding the formation of memory area 985).

Returning to FIG. 10, at step 1010 the number of incorrect user answers is initialized to zero. At step 1015, the set of user questions is sent to the merchant process so that they can be posed to the user in a dialog. In one embodiment, if an alias is required in an answer such requirement is indicated as part of the user question. At step 1020, the user answers, provided by the user in response to a prompt or dialog, are received by the security response handler. The remaining steps process the user answers and eventually decide whether to allow the transaction as described below.

At step 1025, the first user answer received from the merchant process is selected. A decision is made as to whether an alias was required as part of the user answer (decision 1030). If an alias was required, then decision 1030 branches to the "yes" branch whereupon, at step 1035, the user answer is compared with the expected answer (e.g., an alias name rather than the actual contact's name, etc.). On the other hand, if an alias was not required, then decision 1030 branches to the "no" branch whereupon, at step 1040, the user answer is compared with the expected answer (e.g., the actual contact's name, etc.). Various evaluation routines can be used (e.g., only require part of the name, such as the first name or the last name, allow for misspellings, allow for other differences such as capitalization, etc.) to determine whether the user answer matches the expected answer in both steps 1035 and 1040. A decision is made as to whether the user answer matches the expected answer (decision 1050). If the user answer does not match the expected answer, then decision 1050 branches to the "no" branch whereupon, at step 1055, the INCORRECT counter is incremented. On the other hand, if the user answer matches the expected answer, then decision 1050 branches to the "yes" branch bypassing step 1055.

After the selected user answer has been processed, a decision is made as to whether there are more user answers to process (decision 1060). If there are more user answers to process, then decision 1060 branches to the "yes" branch which loops back to select and process the next user answer as described above. This looping continues until all of the user answers have been selected and processed, at which point decision 1060 branches to the "no" branch to determine whether to allow or deny the transaction.

At step 1070 the security level that is needed to approve the transaction against the security strength provided by the set of user questions and expected answers as well as the number of incorrect responses. The security level needed might be based on the monetary amount of the purchase or other factors of the purchase such as the location of the merchant and the category or type of item being purchased. In one embodiment, any incorrect responses (user answers not matching expected answers) result in the transaction being denied, while in another embodiment, the number of incorrect responses is a factor used in determining whether to allow the transaction. A decision is made, based on the evaluation performed at step 1070, as to whether to allow the transaction (decision 1075). If the determination is to allow the transaction based on the evaluation, then decision 1075 branches to the "yes" branch whereupon, at step 1080, a message is returned to the merchant system indicating that the transaction is approved. On the other hand, if the determination is to deny the transaction based on the evaluation, then decision 1075 branches to the "no" branch whereupon, at step 1090, a message is returned to the merchant system indicating that the transaction has been denied.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
a plurality of processors;
a memory coupled to at least one of the processors;
a set of instructions stored in the memory and executed by at least one of the processors to perform alias based social media based identity verification, wherein the set of instructions perform actions of:
receiving a user authentication request pertaining to a user;
retrieving one or more aliases corresponding to one or more social media contacts of the user, wherein the one or more aliases are configured by the user prior to the reception of the authentication request;
calculating a divergence strength score corresponding to a plurality of social media activities, wherein limiting overlap between the one or more social media contacts from which the plurality of social media activities are obtained increases the divergence strength score;
preparing one or more user questions and one or more expected answers based on the one or more aliases corresponding to the user's one or more social media contacts and the plurality of social media activities, wherein the one or more user questions and one or more expected answers are further based upon obtaining a divergence strength score that correlates to a security level received with the user authentication request;
prompting the user to provide one or more user answers responsive to the one or more user questions;
responsive to determining that the one or more user answers match the one or more expected answers, confirming the user authentication request; and
responsive to determining that the one or more user answers fail to match the one or more expected answers, invalidating the user authentication request.

2. The information handling system of claim 1 wherein the actions performed further comprise:
selecting a social media content corresponding to a selected one of the social media contacts corresponding to a selected one of the aliases, wherein at least one of the one or more user questions includes the selected social media content and at least one of the one or more expected answers is the selected one of the aliases.

3. The information handling system of claim 2 wherein the selecting further comprises:
identifying a set of the social media content that has been acknowledged by the user, wherein the selected social media content is selected from the set of social media content.

4. The information handling system of claim 1 wherein the security level is based upon a monetary transaction risk level.

5. The information handling system of claim 1 wherein the actions performed further comprise:
randomly selecting the one or more aliases from a data store maintained by a social media application, wherein a number of aliases selected is based on the security level;
forming the one or more user questions based on the user's one or more social media contacts that correspond to the randomly selected one or more aliases; and
forming the one or more expected answers based on the randomly selected one or more aliases.

6. A computer program product stored in a computer readable device, comprising computer instructions that, when executed by an information handling system, causes the information handling system to perform actions comprising:
receiving a user authentication request pertaining to a user;
retrieving one or more aliases corresponding to one or more social media contacts of the user, wherein the one or more aliases are configured by the user prior to the reception of the authentication request;
calculating a divergence strength score corresponding to a plurality of social media activities, wherein limiting overlap between the one or more social media contacts from which the plurality of social media activities are obtained increases the divergence strength score;
preparing one or more user questions and one or more expected answers based on the one or more aliases corresponding to the user's one or more social media contacts and the plurality of social media activities, wherein the one or more user questions and one or more expected answers are further based upon obtaining a divergence strength score that correlates to a security level received with the user authentication request;
prompting the user to provide one or more user answers responsive to the one or more user questions;
responsive to determining that the one or more user answers match the one or more expected answers, confirming the user authentication request; and
responsive to determining that the one or more user answers fail to match the one or more expected answers, invalidating the user authentication request.

7. The computer program product of claim 6 wherein the actions performed further comprise:
selecting a social media content corresponding to a selected one of the social media contacts corresponding to a selected one of the aliases, wherein at least one of the one or more user questions includes the selected social media content and at least one of the one or more expected answers is the selected one of the aliases.

8. The computer program product of claim 7 wherein the selecting further comprises:
identifying a set of the social media content that has been acknowledged by the user, wherein the selected social media content is selected from the set of social media content.

9. The computer program product of claim 6 wherein the security level is based upon a monetary transaction risk level.

10. The computer program product of claim 6 wherein the actions performed further comprise:
randomly selecting the one or more aliases from a data store maintained by a social media application, wherein a number of aliases selected is based on the security level;
forming the one or more user questions based on the user's one or more social media contacts that correspond to the randomly selected one or more aliases; and
forming the one or more expected answers based on the randomly selected one or more aliases.

* * * * *